United States Patent
Ritter et al.

(10) Patent No.: US 10,602,667 B2
(45) Date of Patent: Mar. 31, 2020

(54) COMBINE HARVESTER CONCAVE ASSEMBLY AND ATTACHMENT METHOD

(71) Applicant: Deere & Company, Moline, IL (US)

(72) Inventors: Aaron S. Ritter, Milan, IL (US); Kevin P. Hurley, Davenport, IA (US); David Rix, Lehi, UT (US); Jonathan M. Kingett, Eldridge, IA (US); Eric L. Bortner, Moline, IL (US)

(73) Assignee: DEERE & COMPANY, Moline, IL (US)

( * ) Notice: Subject to any disclaimer, the term of this patent is extended or adjusted under 35 U.S.C. 154(b) by 62 days.

(21) Appl. No.: 15/618,330

(22) Filed: Jun. 9, 2017

(65) Prior Publication Data

US 2018/0352746 A1 Dec. 13, 2018

(51) Int. Cl.
*A01F 12/24* (2006.01)
*A01F 12/26* (2006.01)
*A01F 12/28* (2006.01)

(52) U.S. Cl.
CPC .............. *A01F 12/24* (2013.01); *A01F 12/26* (2013.01); *A01F 12/28* (2013.01)

(58) Field of Classification Search
CPC .......... A01F 12/24; A01F 12/26; A01F 12/28; A01F 7/06
See application file for complete search history.

(56) References Cited

U.S. PATENT DOCUMENTS

| | | | |
|---|---|---|---|
| 3,742,686 A | 7/1973 | Rowland | |
| 4,711,252 A | 12/1987 | Bernhardt et al. | |
| 5,152,717 A | 10/1992 | Nelson et al. | |
| 5,613,907 A * | 3/1997 | Harden | A01F 12/26 460/109 |
| 5,919,087 A | 7/1999 | Strong et al. | |
| 6,193,604 B1 | 2/2001 | Ramp et al. | |
| 6,358,142 B1 | 3/2002 | Imel et al. | |
| 6,443,835 B1 | 9/2002 | Imel et al. | |
| 6,503,142 B2 | 1/2003 | Imel et al. | |
| 7,393,274 B2 | 7/2008 | Voss et al. | |
| 2006/0019731 A1 * | 1/2006 | Ricketts | A01F 12/26 460/108 |

(Continued)

FOREIGN PATENT DOCUMENTS

| | | |
|---|---|---|
| EP | 1964464 A1 | 9/2008 |
| EP | 2514300 A1 | 10/2012 |

OTHER PUBLICATIONS

European Patent Office Extended Search Report for Application No. 18176694.0 dated Oct. 9, 2018 (9 pages).

*Primary Examiner* — Alicia Torres
(74) *Attorney, Agent, or Firm* — Micheal Best & Friedrich LLP (57) ABSTRACT

A concave assembly for an agricultural machine includes a frame pivotally connected to a structural component and a concave connected to the frame. The frame includes a trunnion having a front end and a rear end. A front arm and a rear arm are connected to the trunnion. A crossbar extends between the front arm and the rear arm. A rotating member rotatably connected to the crossbar. The concave includes a first outer support and a second outer support. An inner support is positioned between the first outer support and the second outer support. A plurality of separator bars extend between the first outer support and the second outer support.

17 Claims, 11 Drawing Sheets

(56) References Cited

U.S. PATENT DOCUMENTS

| | | | |
|---|---|---|---|
| 2007/0178951 A1 | 8/2007 | Voss et al. | |
| 2012/0270612 A1* | 10/2012 | Baltz | A01F 12/24 460/109 |
| 2015/0250101 A1* | 9/2015 | Kile | A01D 41/12 460/108 |
| 2016/0345499 A1* | 12/2016 | Van Hullebusch | A01F 7/06 |

* cited by examiner

COMBINE HARVESTER CONCAVE ASSEMBLY AND ATTACHMENT METHOD

FIELD

Various exemplary embodiments relate to a concave for an agricultural combine and in particular to a concave that sheds crop material to avoid plugging when harvesting green plant material, high moisture corn or a high volume throughput of dry crop material.

BACKGROUND

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have a rotary crop processing unit formed by a rotor and a casing surrounding the rotor. The rotary crop processing unit has an inlet transition section for pulling crop material into a rotary crop processing unit from the feederhouse. The rotary crop processing unit includes a threshing section for threshing the crop material and a separating section for separating the grain from the threshed crop material. The bottom of the casing is provided with a series of grates through which the grain and chaff fall from the casing. The grates, located beneath the threshing section of the rotary crop processing unit, comprise a concave.

Crop material, especially green crop material and high volume crop material, tends to plug the concave, not allowing grain to pass through the concave and thus reducing capacity and threshing ability. Furthermore, in some rotary combines, it is necessary to change between two different concaves, with different sized openings, when changing between harvesting of small and large grain crops.

SUMMARY

According to an exemplary embodiment, a concave assembly for an agricultural machine includes a frame pivotally connected to a structural component and a concave connected to the frame. The frame includes a trunnion having a front end and a rear end. A front arm and a rear arm are connected to the trunnion. A crossbar extends between the front arm and the rear arm. A rotating member rotatably connected to the crossbar. The concave includes a first outer support and a second outer support. An inner support is positioned between the first outer support and the second outer support. A plurality of separator bars extend between the first outer support and the second outer support.

According to another exemplary embodiment, an agricultural machine includes a rotary crop processing unit having a first rotor and a second rotor. A connector rail extends along an axial length and is positioned between the first rotor and the second rotor. A first frame is pivotally connected to the connector rail and has a first engaging member. A second frame is pivotally connected to the connector rail opposite the first frame and a has a second engaging member. A first concave is connected to the first frame and extends underneath the first rotor. A second concave is connected to the second frame and extends underneath the second rotor. The first engaging member is configured to engage the second frame to limit rotation of the first frame in a first direction, and the second engaging member is configured to engage the first frame to limit rotation of the second frame in a second direction.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
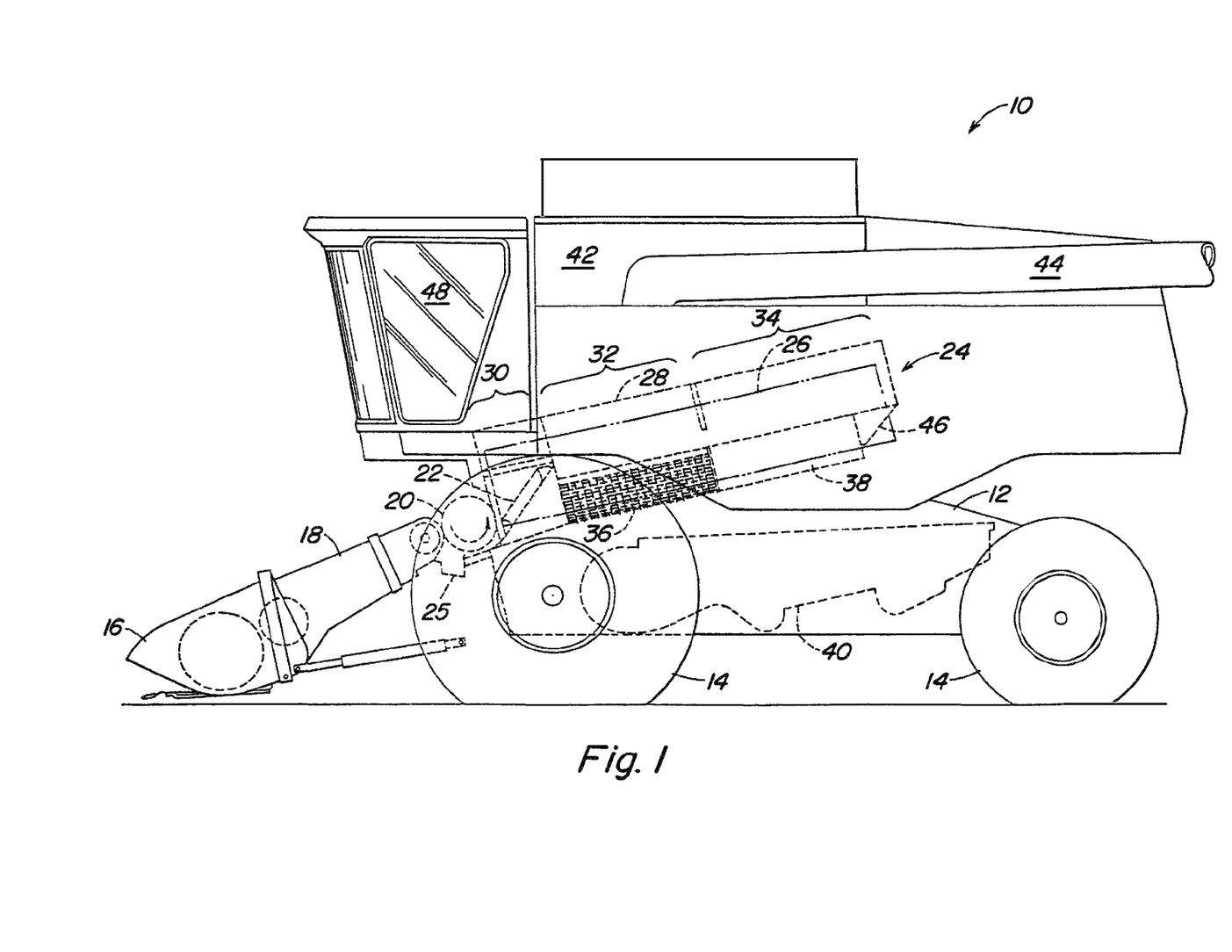
FIG. 1 is a schematic, side vide of a combine having a rotary processing unit.

FIG. 1 shows an agricultural machine embodied as a combine 10 comprising a supporting structure 12 having ground engaging members 14 extending from the supporting structure 12. A harvesting platform 16 is used for harvesting a crop and directing it to a feederhouse 18. The harvested crop is directed by the feederhouse 18 to a beater 20. The beater directs the crop upwardly through the inlet transition section 22 to the rotary crop processing unit 24. A rock trap 25 is positioned between the feederhouse and the beater 20.

The rotary crop processing unit 24 threshes and separates the harvested crop material. The processing unit 25 comprises a rotor 26 radially surrounded by a casing 28 that together define an inlet section 30, a threshing section 32 and a separating section 34. The rotor 26 comprises a hollow cylindrical drum having a plurality of crop processing elements that engage the crop and rotate it in the casing 28. The bottom of the casing has a concave 36 under the threshing section 32 and a separating grate 38 under the separating section 34.

Grain and chaff falling through the concave 36 and the separating grate 38 are directed to cleaning system 40. The cleaning system 40 removes the chaff and directs the clean grain to a clean grain elevator (not shown). The clean grain elevator deposits the clean grain in a grain tank 42. The clean grain in the tank 42 can be unloaded into a grain cart or truck by an unloading auger 44.

Threshed and separated straw is discharged from the rotary crop processing unit 24 through outlet 46 to a discharge beater (not shown). The discharge beater in turn propels the straw out the rear of the combine. The operation of the combine is controlled from operator's cab 48.

Figure 2:
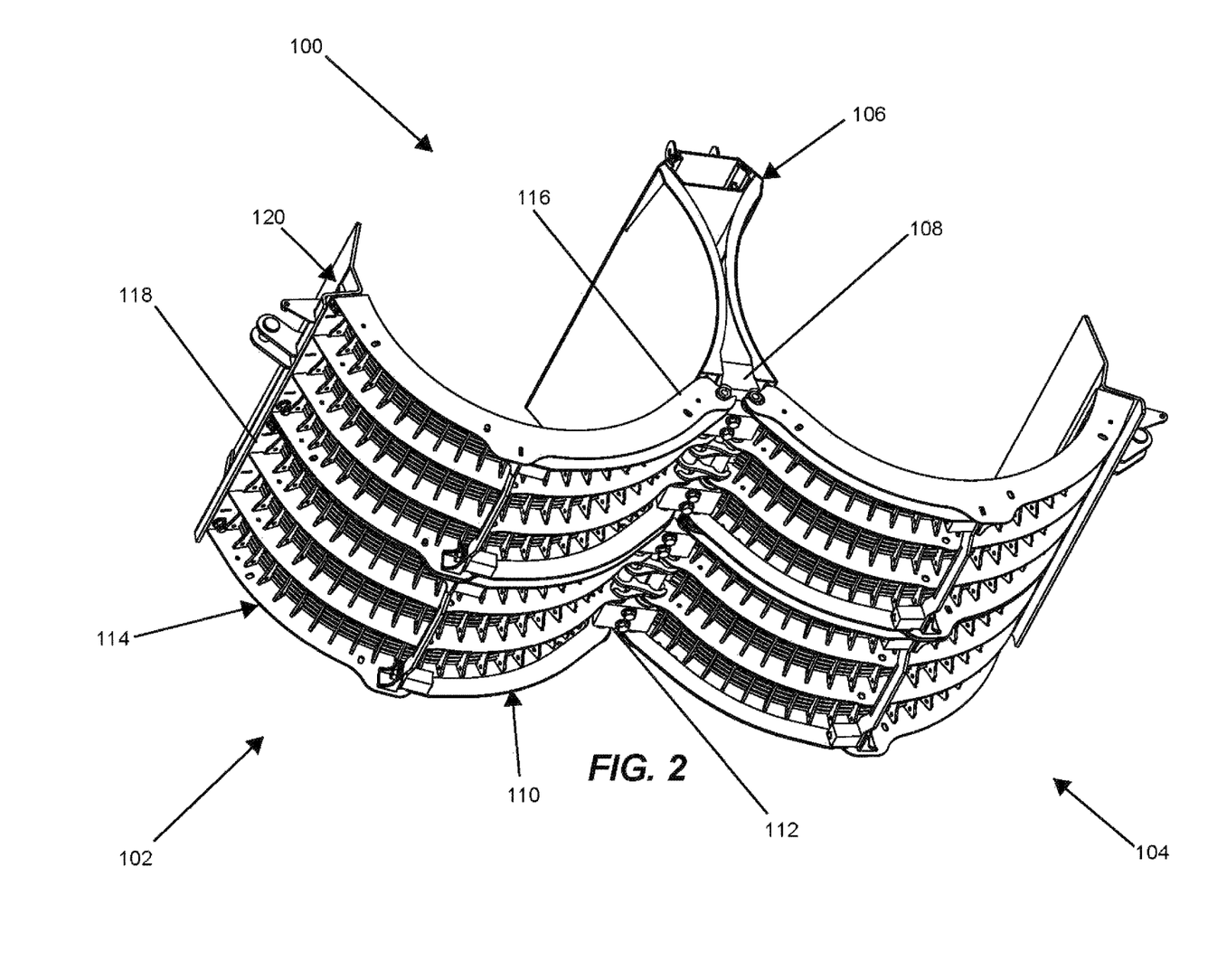
FIG. 2 is a bottom perspective view of a double concave assembly.
Figure 3:
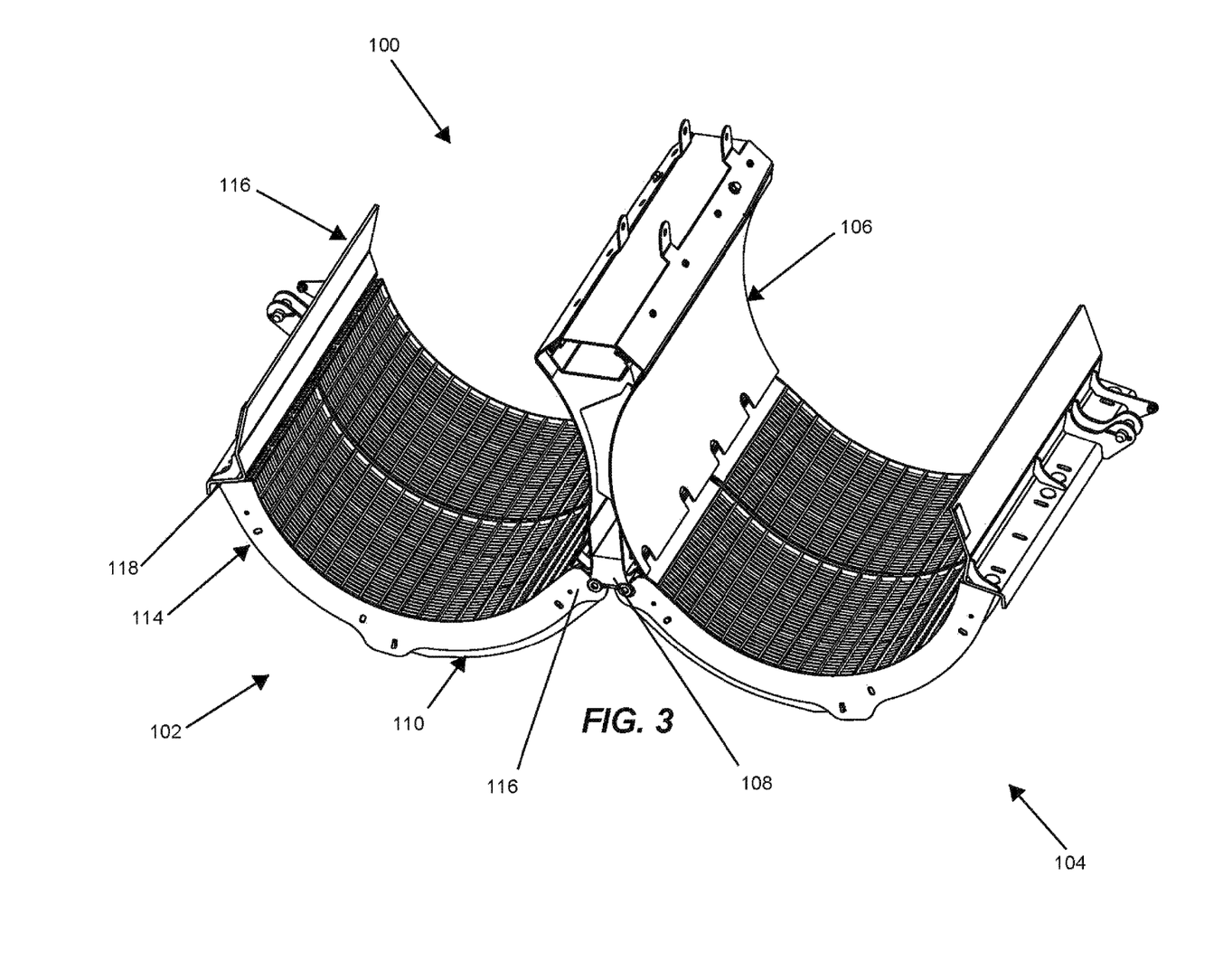
FIG. 3 is a top perspective view of FIG. 2.

FIGS. 2 and 3 show an exemplary embodiment of a double concave assembly 100 having a first set of concaves 102 and a second set of concaves 104 connected to a central spine 106. The spine 106 is a structural component positioned in the combine 10. A connector rail 108 is positioned at the bottom of the spine 106. One or more frames 110 are pivotally connected to the connector rail 108 on each side of the spine 106. As best shown in FIG. 1, the frames no are connected by one or more clamps 112 positioned along the axial length of the spine 106. A concave 114 is connected to each of the frames 110.

The illustrated embodiment depicts two frames no and two concaves 114 on each side of the spine 106, however any number of frames no and concaves 114 can be used depending on the size of the combine 10. The concaves 114 have a curved configuration and extend from an inner end 116 adjacent the spine 106 to an outer end 118. The outer end 118 of the concaves can be connected to a Z-bar 120. As would be understood by one of ordinary skill in the art, the Z-bar 120 can be connected to a hydraulic system that can move the concaves 114 and frames 110 toward and away from the rotor 26 in a radial direction.

Figure 4:
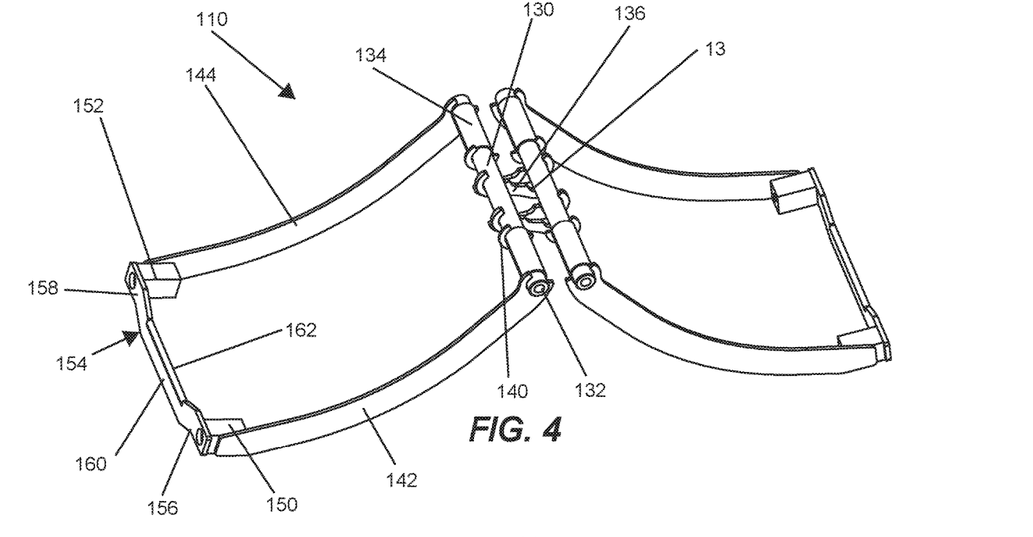
FIG. 4 is a top perspective view of a pair of frame members.

FIG. 4 shows an exemplary embodiment of the frames 110. Each frame 110 includes a trunnion 130 that is connected to the connector rail 108 by the clamps 110. The trunnion 130 has a front end 132 facing the front or inlet of the combine 10 and an opposite rear end 134. A pair of engaging members 136 are positioned in a central region of the trunnion 130. The engaging members 136 extend from the trunnion 130 toward an opposite frame no. The engaging members 136 include a curved end portion 138 that is configured to engage the trunnion 130 of the opposite frame 110. This engagement acts to limit the rotation of the frames 110 with respect to the rail 108. A pair of flanges 140 are spaced from the engaging members 136 on the trunnion 130. The flanges 140 abut the clamps no, resisting axial movement of the frames 110 along the spine 106. The flanges 140 can also be used as indicators to assist an installer in properly aligning the clamps no along the rail 108.

A front arm 142 and a rear arm 144 extend from the trunnion 130 away from the spine 106 and toward an outer side of the combine 10. The arms 142, 144 have a curved configuration with a first end connected to the trunnion 130 and an opposite second end. A front mounting block 150 and a rear mounting block 152 are positioned adjacent the front and rear arms 142, 144, respectively. Each of the mounting blocks 150, 152 include an opening configured to receive a fastener. The fastener can be threadably connected to the opening or it can be a bolt having a head positioned on one side of the mounting blocks and a nut positioned on the opposite side of the mounting blocks 150, 152. In some embodiments, the mounting blocks 150, 152 can include a capture feature, such as a hex opening, configured to receive and prevent rotation of a nut.

A crossbar 154 extends between the front and rear arm 142, 144 and has a first end 156 connected to the front mounting block 150 and a second end 158 connected to the rear mounting block 152. The crossbar 154 includes a central portion 160 that is positioned lower than the first and second ends 156, 158. The central portion 160 receives a rotating member 162 that is rotatably connected to the crossbar 154. In the illustrated embodiment, the rotating member 162 is a cylindrical pin.

Figure 5:
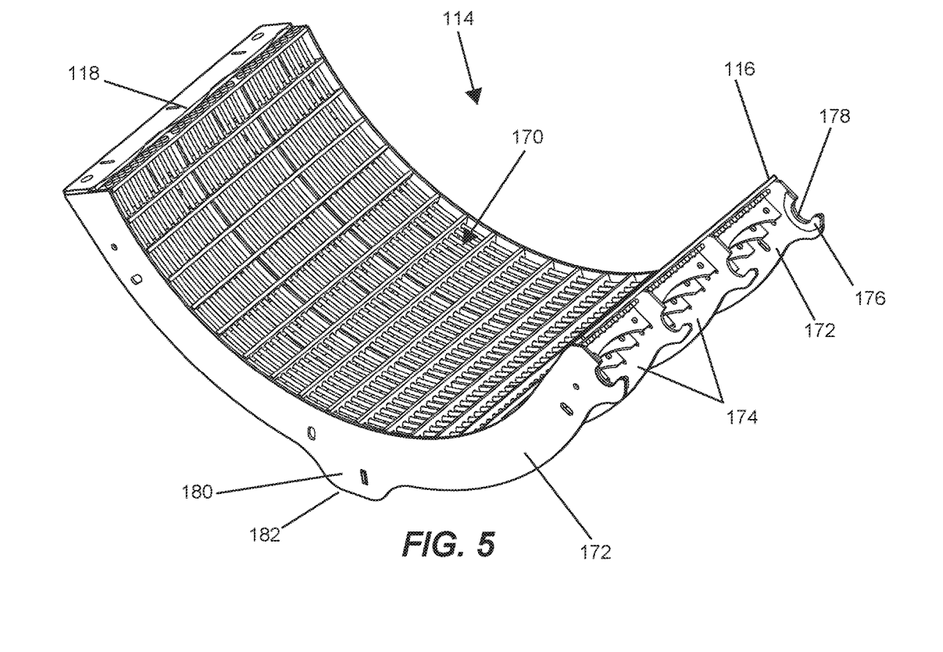
FIG. 5 is a top perspective view of a concave.
Figure 6:
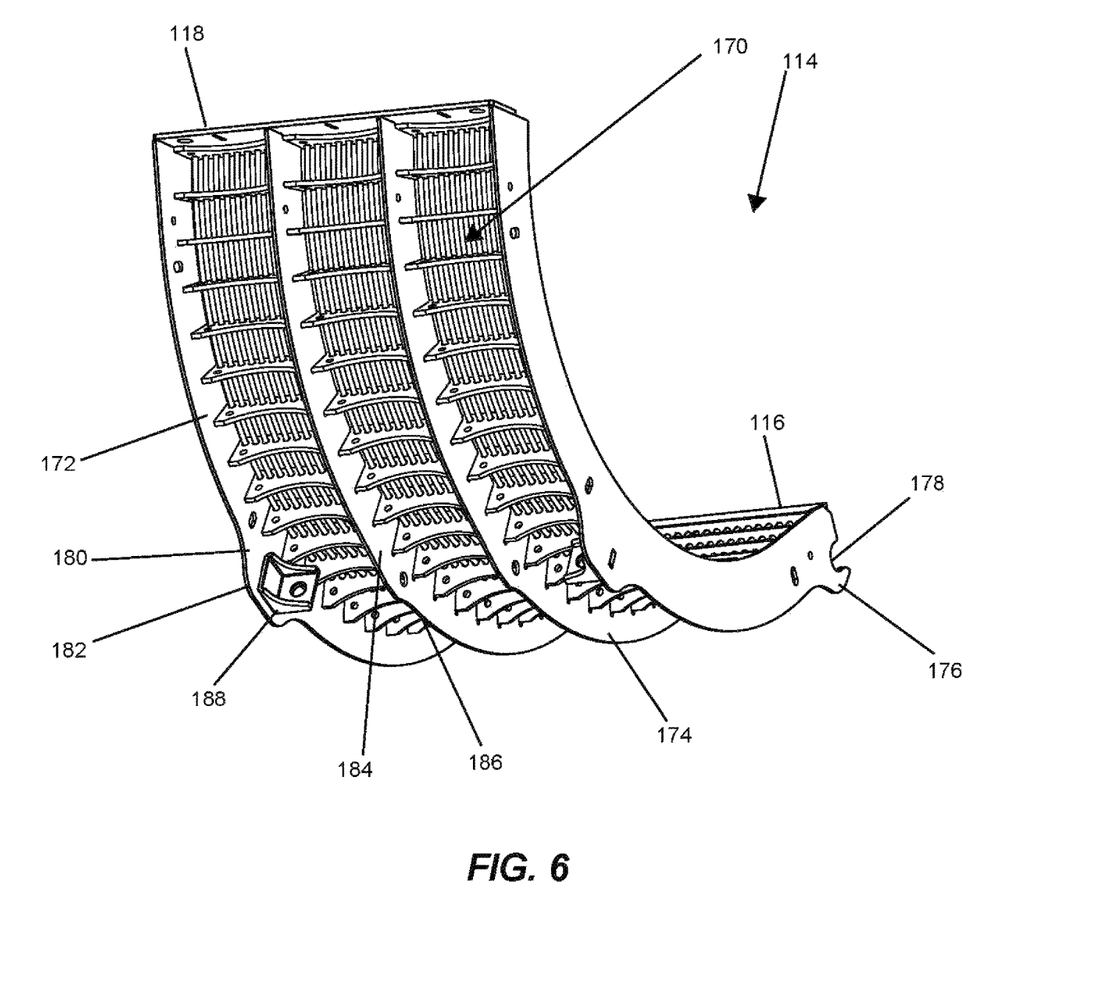
FIG. 6 is a bottom perspective view of FIG. 5.

FIGS. 5 and 6 show an exemplary embodiment of a concave 114. The concave 114 includes separator bars 170 extending between supports, including a pair of outer supports 172 and a pair of inner supports 174. Each of the supports 172, 174 includes a forked end 176 having a channel 178 for receiving the trunnion 130 of the frame 110. In an exemplary embodiment the channel 178 is sized larger than the diameter of the trunnion 130 to provide clearance between the two components. In an unstressed position, the trunnion 130 will not engage the forked end 176, but contact can be made when there is external loading.

As best shown in FIG. 6, the outer supports 172 include an outer lobe 180 having a flattened bottom 182 and the inner supports 174 include an inner lobe 184 having a flattened bottom 186. The outer lobes 180 are larger and extend down further than the inner lobes 184. Mounting brackets 188 are connected to the outer lobes 180 and include an opening configured to align with (e.g. coaxial with) the opening of the mounting blocks 150, 152.

Figure 7:
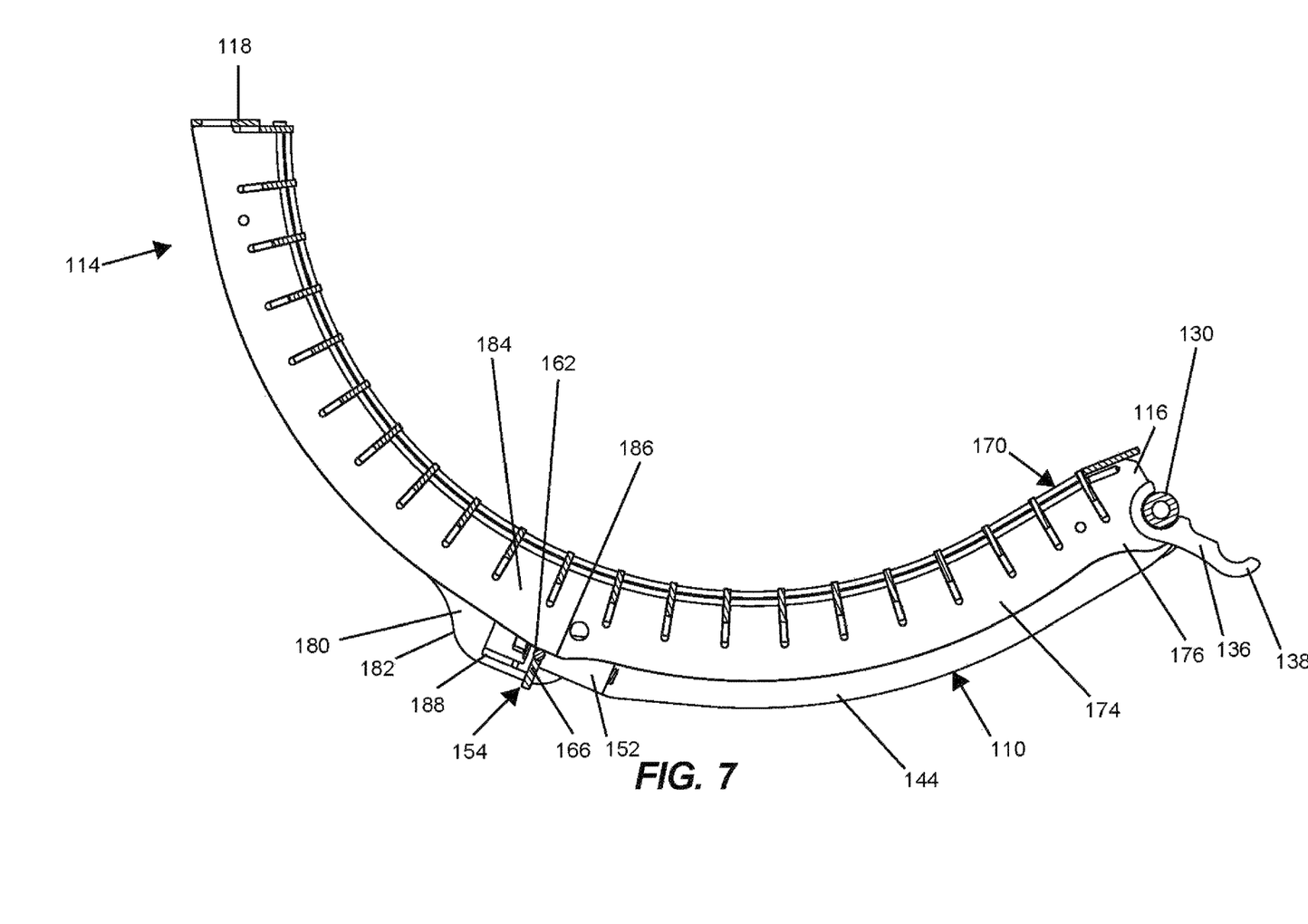
FIG. 7 is a side, sectional view of the concave connected to the frame.
Figure 8:
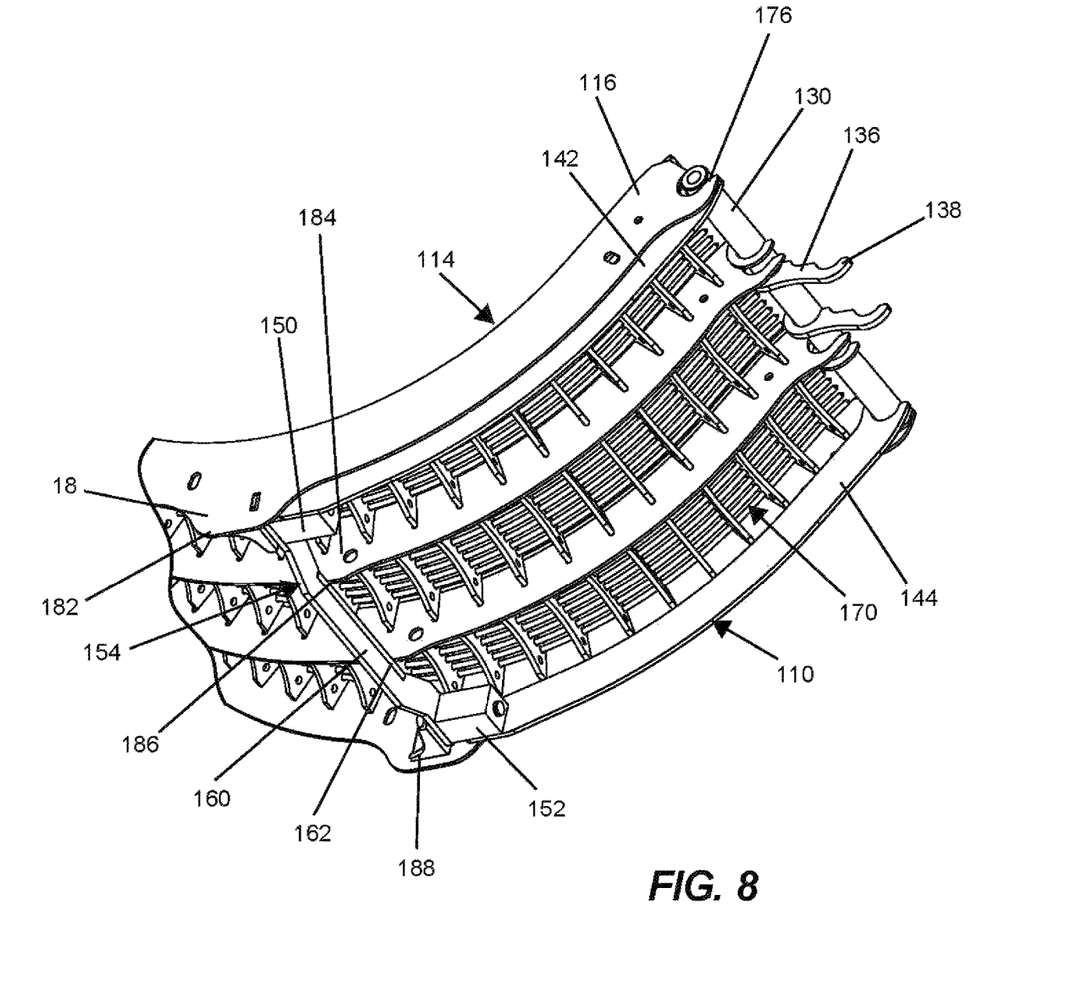
FIG. 8 is a bottom perspective view of the concave connected to the frame.
Figure 9:
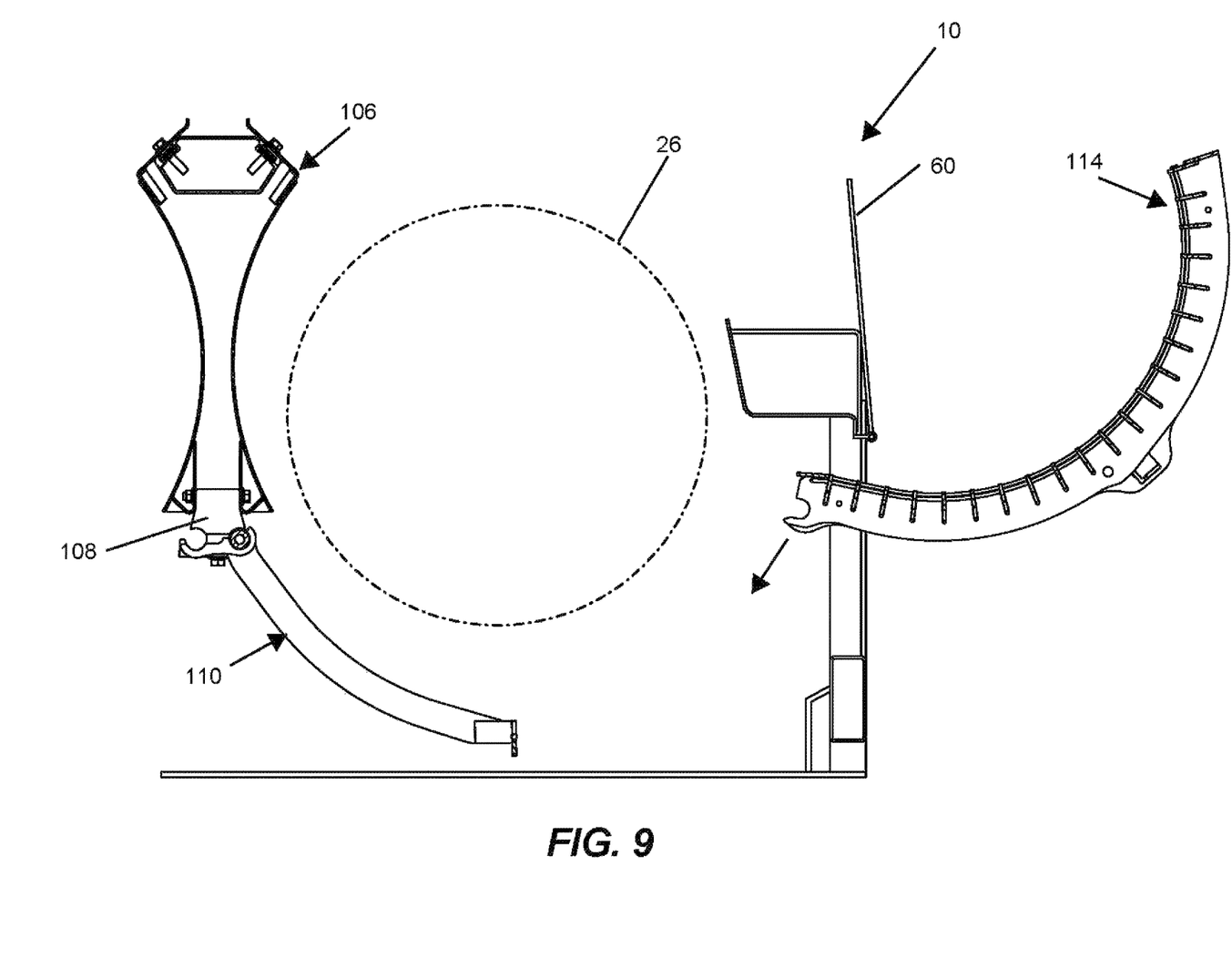
FIG. 9 is a schematic view of a concave being installed into a combine.
Figure 10:
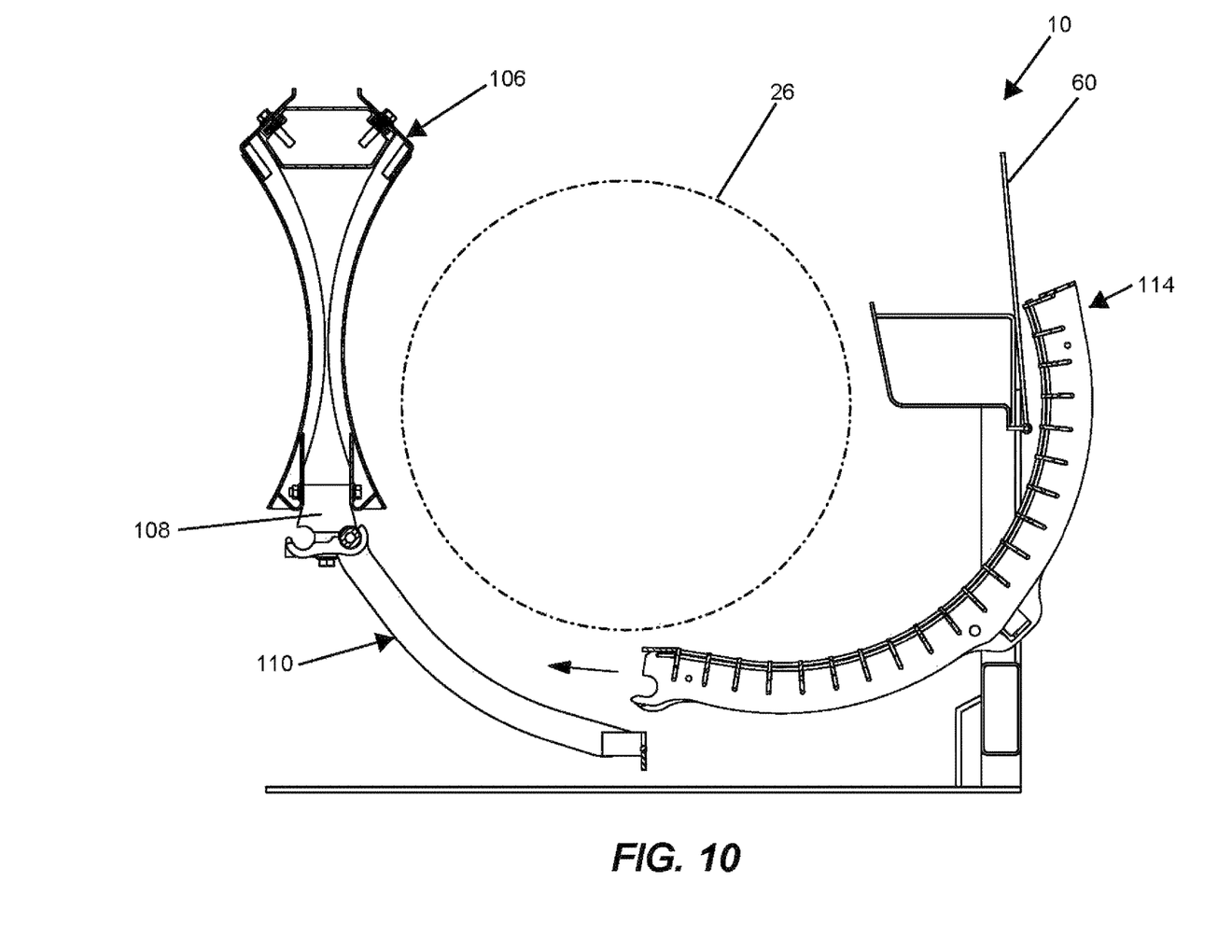
FIG. 10 is a schematic view of a concave being installed into a combine.
Figure 11:
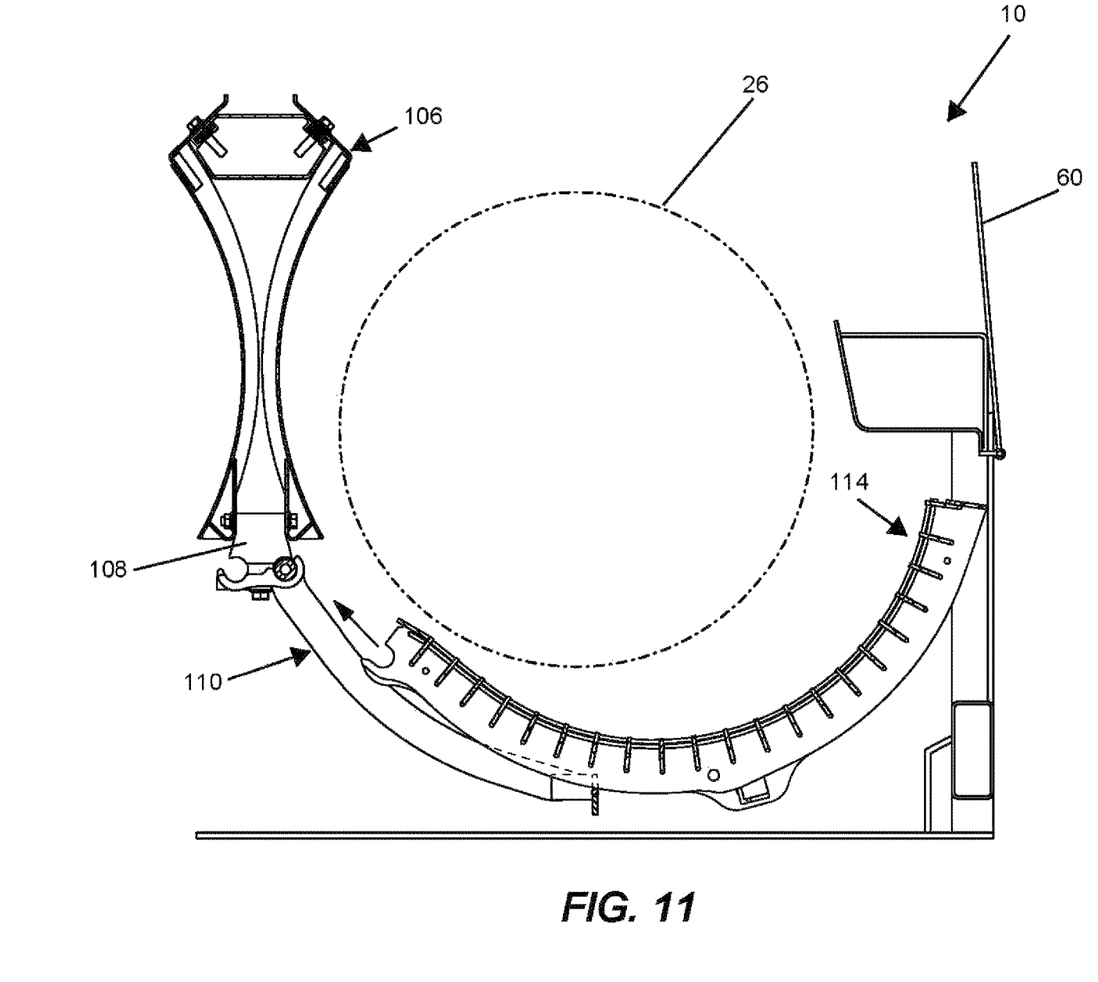
FIG. 11 is a schematic view of a concave being installed into a combine.
Figure 12:
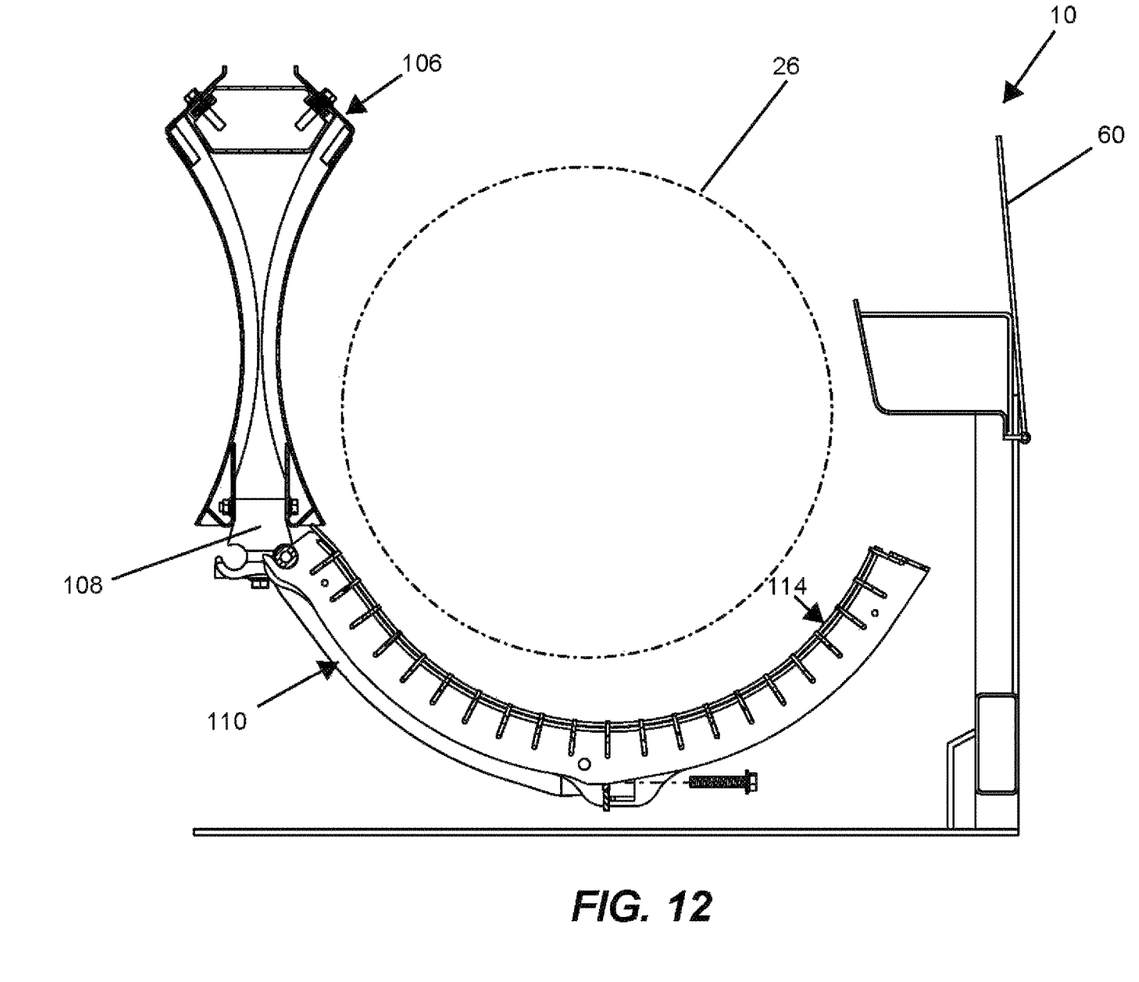
FIG. 12 is a schematic view of a concave being installed into a combine and connected to a frame.

FIGS. 7 and 8 show the concave 114 connected to the frame 110. The concave 114 is positioned over the frame no that the front and rear arms 142, 144 are positioned inside of the outer supports 172. The channels 178 in the forked ends 176 of the supports receive the trunnion 130 of the frame 110. The mounting brackets 188 are aligned with the mounting blocks 150, 152 and the crossbar 154 extends between the outer lobes 180, with the inner lobes 184 positioned over the central portion 160 of the crossbar 154 and the rotating member 162. As shown in FIG. 7, fasteners extend through the mounting brackets 188 and at least partially into the mounting blocks 150, 152 to secure the concave 114 to the frame 110.

FIGS. 9-12 show the steps to install the concave 114 onto the frame 110 in the combine 10. The concave area can be accessed through a side door 60 in the combine 10. The frames no typically remain connected to the rail 108, but the concaves 114 can be removed for cleaning or replacement, or can be changed to accommodate different crops. The concave 114 is initially inserted through a side door 60 in the combine 10. The concave 114 can be rotated or angled to maneuver the interior end 116 around the rotor 26. A user supports the concave 114 and inserts it through the side door 60 until the concave 114 can rest on the frame 110. For example, the inner supports 174 are positioned so that they engage the rotating member 162. Once the user rests the concave 114 on the frame 110, the full weight of the concave 114 does not need to be supported. The concave 114 can then be pushed, causing it to slide relative to the frame 110, assisted by rotation of the rotating member 162. The concave will slightly rise as the rotating member 162 engages the inner lobe 184, alerting the user that the concave 114 is almost in position. With the rotating member 162 engaging the flat section 186 of the inner lobes 184, the concave 114 is fully supported by the frame 110. The user can make any needed adjustments and can then secure the concave 114 to the frame no and to the Z-bar 120. The concave 114 can be removed in a similar manner, but in reverse. Utilizing this structure, it is possible for a single person to install or remove a concave 114 from the outside of the combine 10.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed is:

1. A concave assembly for an agricultural machine, the concave assembly comprising:
    a frame including,
        a trunnion having a front end and a rear end,
        a front arm connected to the trunnion proximate the front end, the front arm having a first distal end opposite the trunnion,
        a rear arm connected to the trunnion proximate the rear end, the rear arm having a second distal end opposite the trunnion,
        a crossbar extending between the first distal end and the second distal end along a longitudinal axis, and
        a rotating member rotatably connected to the crossbar, the rotating member having an axis of rotation parallel to the longitudinal axis of the crossbar; and
    a concave connected to the frame, the concave including,
        a first outer support and a second outer support,
        an inner support positioned between the first outer support and the second outer support, and
        a plurality of separator bars extending between the first outer support and the second outer support,
    wherein the rotating member is configured to rotatably engage the concave to assist in sliding the concave relative to the frame.

2. The concave assembly of claim 1, wherein the frame is rotatably connected to a connector rail and wherein the frame includes an engaging member extending from the trunnion and the engaging member is configured to limit rotation of the frame with respect to the connector rail.

3. The concave assembly of claim 1, wherein the frame includes a front mounting block and a rear mounting block.

4. The concave assembly of claim 3, wherein the concave includes a first mounting bracket aligned with the front mounting block and a second mounting bracket aligned with the rear mounting block.

5. The concave assembly of claim 4, wherein the first mounting bracket is connected to the first outer support and the second mounting bracket is connected to the second outer support.

6. The concave assembly of claim 4, wherein a fastener extends through the first mounting bracket and at least partially into the first mounting block.

7. The concave assembly of claim 1, wherein the concave includes a forked end at least partially defining a channel receiving the trunnion.

8. The concave assembly of claim 1, wherein the inner support includes a lobe having a flat bottom that engages the rotating member.

9. The concave assembly of claim 1, wherein the front arm and the rear arm are positioned between the first outer support and the second outer support.

10. A method of installing a concave in an agricultural machine, the method comprising:
    inserting a concave into an agricultural machine, the concave including,
        a first outer support and a second outer support,
        an inner support positioned between the first outer support and the second outer support,
        a plurality of separator bars extending between the first outer support and the second outer support;
    positioning the concave adjacent to a frame, the frame comprising
        a trunnion having a front end and a rear end,
        a front arm connected to the trunnion proximate the front end, the front arm having a first distal end opposite the trunnion,
        a rear arm connected to the trunnion proximate the rear end, the rear arm having a second distal end opposite the trunnion,
        a crossbar extending between the first distal end and the second distal end along a longitudinal axis, and
        a rotating member rotatably connected to the crossbar, the rotating member having an axis of rotation parallel to the longitudinal axis of the crossbar;
    engaging the concave with the frame so that the inner support engages the rotating member;
    sliding the concave relative to the frame, wherein the engagement of the inner support with the rotating member causes rotation of the rotating member; and
    securing the concave to the frame.

11. The method of claim 10, wherein the frame is pivotally connected to a connector rail and the frame includes an engaging member configured to limit rotation of the frame in a first direction.

12. The method of claim 10, wherein the concave includes a forked end defining a channel, and wherein the trunnion is received in the channel.

13. The method of claim 10, wherein securing the concave to the frame includes extending a fastener into the concave and into a mounting block connected to the frame.

14. The method of claim 10, wherein engaging the concave with the frame includes engaging a lobe of the concave with the rotating member.

15. The method of claim 10, wherein the rotating member includes a cylindrical pin.

16. The concave assembly of claim 1, wherein the rotating member includes a cylindrical pin.

17. A concave assembly for an agricultural machine, the concave assembly comprising:
    a frame including,
        a trunnion having a front end and a rear end,
        a front arm connected to the trunnion,
        a rear arm connected to the trunnion,
        a crossbar extending between the front arm and the rear arm, and
        a rotating member rotatably connected to the crossbar, the rotating member having an axis of rotation parallel to a longitudinal axis of the crossbar; and
    a concave connected to the frame, the concave including,
        a first outer support and a second outer support,
        an inner support positioned between the first outer support and the second outer support, and
        a plurality of separator bars extending between the first outer support and the second outer support, wherein the rotating member is configured to rotatably engage the concave to assist in sliding the concave relative to the frame, and wherein the front arm and the rear arm are positioned between the first outer support and the second outer support.

\* \* \* \* \*